United States Patent [19]

Reiling

[11] Patent Number: 4,606,938

[45] Date of Patent: Aug. 19, 1986

[54] CONCRETE TREATMENT METHODS

[76] Inventor: Thomas L. Reiling, 4264 SE. Fairway East, Stuart, Fla. 33494

[21] Appl. No.: 613,758

[22] Filed: May 24, 1984

Related U.S. Application Data

[63] Continuation of Ser. No. 348,366, Feb. 12, 1982, abandoned.

[51] Int. Cl.$^4$ ................................................ B05C 1/16
[52] U.S. Cl. ..................................... 427/136; 427/140; 427/283
[58] Field of Search ................... 252/100, 142; 134/3; 427/136, 140, 283; 106/12

[56] References Cited

U.S. PATENT DOCUMENTS

| | | | |
|---|---|---|---|
| 2,241,790 | 5/1941 | Rembert | 252/142 |
| 2,712,511 | 7/1955 | Orozco | 148/6.14 A |
| 3,901,836 | 8/1975 | Kader | 106/14.12 |

Primary Examiner—Lorenzo B. Hayes
Attorney, Agent, or Firm—James T. FitzGibbon; Angelo J. Bufalino

[57] ABSTRACT

A method for treating and cleaning stained concrete surface which involves applying a phosphoric acid-containing solution to said surface and drying same.

3 Claims, No Drawings

CONCRETE TREATMENT METHODS

This application is a continuation, of application Ser. No. 348,366, filed Feb. 12, 1982, now abandoned.

The present invention relates generally to chemical compositions and more particularly to compositions which are adapted to treat Portland cement-containing concrete, including compositions used in making concrete structures, driveways, sidewalks, and the like to remove and/or cover discoloration therefrom.

Specifically, the present invention relates to a composition which is adapted to treat stained surfaces of such concrete compositions with a reactive material which will render the stain effectively invisible by what is believed to be an action involving solublizing the colored portion of the stain, producing a water insoluble pigment in place on the surface, and then fixing the pigment to the surface by a binder which is included in the composition.

While the exact chemistry of the reactions involved in carrying out the present invention is not known with certainty, it has been found that the addition of a phosphoric acid or like stain treatment material, preferably in the presence of oxalic acid, and a binder such as starch or the like, enables a stain to be treated in place to produce a white precipitate, and at the same time, enables the precipitate to be bound to the concrete surface to brighten it and to cover remaining undissolved stains. The composition may be applied by brushing, rolling or spraying, for example.

Concrete formed with Portland cement is an extremely common building material, having a number of well known advantages and characteristics including economy, strength, ability to be combined with different materials, including reinforcing structures, fire resistance, and, to a certain extent, decorative and texture receiving characteristics. However one chronic drawback with concrete structural surfaces, particularly exterior surfaces, including sidewalks, and building exteriors is that they are very susceptible to staining. The most common stains are those which arise as a result of the deposition of iron, rust and/or tannin-containing compositions.

In certain areas, wherein there is significant tannin and iron in water, the reaction appears to take place between the Portland cement or other component of concrete and the impurities in the water. These result in the deposition of rust or other stains on the concrete surfaces. In the case of driveways, sidewalks, and the like, particularly those wherein the surrounding lawn is watered frequently, the stains detract significantly from the appearance of these elements of the landscape. In other cases, such as brick and motrtar structures, stains resulting from rust created by concrete impurities, by reaction of water and/or air with window or door jambs or sashes, etc., tend to deposit along vertical lines where water has carried the staining material downwardly. In building structures wherein concrete is the principal exterior facing material, the problem of stains is even more important.

In the prior art, attempts to deal with stains on concrete have generally involved attempts to remove the stain by mechanical abrasion, such as sand or grit blasting, or by a chemical treatment which etches and, hence, ultimately degrades the concrete surface. Such latter treatments include treatment with hydrochloric (muriatic) acid. Concrete stain-removing treatments are of environmentally undesirable because of the creation of dust on the one hand, and chemical residues on the other. Moreover, they tend to remove a part of the substrate, and this can be done only a certain number of times before permanent damage is inflicted on the substrate.

Moreover, certain of these methods are relatively costly, and as a result, those who own and deal with concrete structures have often faced the undesirable alternatives of dealing with discolored or disfigured structures, or expending measurable amounts of money in maintaining them. Other alternatives, such as painting or whitewashing, are only marginally successful and expensive. In the case of brick and mortar construction, painting is totally impractical. In the other cases, the problems involve not only the difficulty of applying the paint to often rough or porous surfaces, but also involve the well known difficulties associated with causing paint to adhere satisfactorily to concrete. Concrete is highly alkaline in nature, and materials which damage and/or loosen paint are continually leached out as the concrete surface is repeatedly wetted, as by rain or otherwise.

In view of the shortcomings of prior art methods, adapted to deal with the problem of stained concrete structures, it is an object of the present invention to provide an improved surface treatment for concrete structures.

Another object is to provide a chemically simple and economical composition for treating concrete structures to eliminate or diminish unsightly staining thereof.

A further object is to provide a chemical composition which can be applied to concrete structures, brick and mortar structures, and the like, by simple methods not requiring special skill or equipment.

A still further object is to provide a chemical composition which can be applied to brick and mortar structures for effective treatment of the mortar without adversely affecting the color or texture of the brick material.

Yet another object is to provide a chemical composition which will dissolve stains, create a pigment on the work site, and bind the newly formed pigment to the surface to improve its appearance.

Another object is to provide a chemical treatment composition which can be used on brick and mortar construction by application to the entire brick and mortar surface, and which will thereupon treat the mortar so as to remove the stains therefrom and place a protective pigment coating thereover, without in any way damaging the esthetic appearance of the bricks forming the remainder of the brick and mortar surface.

A further object of the invention is to provide a phosphate containing compound, preferably one derived from phosphoric acid or similar materials which is effective to create a pigment by reaction with materials contained in a Portland cement containing concrete, which composition further includes a binder material to bind the pigment thus formed to the concrete substrate.

A still further object is to provide a concrete surface treatment composition which includes, in addition to phosphoric acid or the like, another acid such as oxalic, acid, and a binder such as a starch or cellulosic material, with all materials being able to be combined into a liquid-in-water mix which is suitable for application to concrete surfaces by spraying, brushing or rolling.

Yet another object is to provide an improved method of treating driveways, sidewalks, and other concrete containing structures.

Another object is to provide treatment compositions and methods for concrete structures which are not destructive of the structure or of the environment.

A further object to the invention is to provide a treatment for a concrete substrate which is effective to remove iron, rust stains and tannin-based stains.

Another object of the invention is to provide a composition which is compatible with, and which may include, additional pigments, perfumes, wetting agents, fungicides, insecticides or the like.

Another object is to provide a novel landscape treatment method which includes periodically injecting a treatment solution into a sprinkler system, which solution can serve to fertilize a lawn when falling on the lawn, and which, when falling on concrete driveways or sidewalks, will serve to remove stains therefrom and at the same time bind a covering pigment which has been produced in place to such driveways and sidewalks.

A further object of the invention is to provide a composition having a pigment forming constituent and an adhesive forming constiuent, wherein the adhesive forming constituent also retards evaporization of the water phase of the composition so as to permit the pigment making reaction to continue over an extended time.

A still further object is to provide a composition for treating concrete which may include a wide variety of adhesive forming constituents including those which are soluble in water as well as those which are themselves insoluble, but able to be emulsified in water.

The foregoing and other objects and advantages of the invention are achieved in practice by providing a phosphoric acid or the like composition, with or without oxalic acid, and further including a binder, with the binder being water dispersable and able to create effective binding of the pigment formed by the reaction between the phosphate material and the concrete to the substrate, to achieve an in-place covering of such concrete substrate.

The exact manner in which the foregoing and other objects are achieved in practice will become more clearly apparent when reference is made to the following detailed description of the preferred embodiments of the invention set forth by way of the various examples and otherwise in the following detailed description of the invention.

DESCRIPTION OF THE PREFERRED EMBODIMENTS OF THE INVENTION

While the invention is able to be practiced using a wide variety of compositions, a number of examples will be given wherein the object to be treated is a concrete sidewalk or driveway, and wherein the composition is intended for application by spraying.

EXAMPLE 1

It was desired to treat a concrete driveway containing stains believed to have resulted from application to the concrete substrate of iron-containing residues, as well as what are believed to be tannin-containing reaction products. In this connection, by "tannin" is meant tannic acid and its derivatives, as referred to elsewhere herein.

The following ingredients were used in the proportions set forth below.

TABLE 1

| Ingredient | Parts by Weight |
| --- | --- |
| Starch (clear gel instant, National Starch) | 1 |
| Phosphoric Acid (75% by weight, aqueous solution) | 1 |
| Water | 8 |

In preparing the foregoing composition for use, the starch was mixed into the water with a high speed agitator at room temperature (20° to 25° C.), resulting in a viscous gel. The phosphoric acid was added gradually with stirring, and a noted reduction in viscosity was achieved.

The mixture was then ready to apply with a roller, spray, or the like. Such a mixture is suitable for application without change for an extended time; in other words, it has a shelf life of six to eight months or more.

This mixture was then used to treat a concrete driveway, having substantial brown stains, believed to be caused by the presence of iron rust and perhaps tannin-containing or tannin-based materials. When sprayed on a concrete driveway in quantities sufficient to thoroughly wet the driveway, and then permitted to dry, over a period of one hour or more, the composition caused driveway surface gradually to change into a lighter color, and the stains previously disappeared. The appearance of the driveway as seen by the naked eye, was approximately the same as that of a newly poured and hardened driveway. The driveway presented an appearance of being substantially whiter than before treatment, such driveway having been several years old before treatment thereof.

The concrete driveway was then tested by foot and auto passage thereover. It was subjected to heavy rains in season (in the south/south central Flordia east coast area) and to daily or almost daily sprinkler wettings during the spring, summer and fall. The driveway was exposed to the sun, as opposed to being shielded or shaded. The generally pleasing white appearance remained, even after this time. When subjected to the classic iodine test, a representative portion of the driveway surface showed that measurable amounts of binder still remainded, as evidenced by characteristic discoloration of the treated surface, showing the presence of starch.

EXAMPLES 2-8

Various other compositons having similar ingredients were tested using the same mixing techniques as those described in connection with mixing the ingredients of Example 1. The mixtures constituting these examples are set forth in Table 2, below.

TABLE 2

| Ex. No. | Ingredient | Parts by Weight |
| --- | --- | --- |
| 2 | Starch (same as above) | 1 |
|  | Phosphoric acid (same as above) | 1 |
|  | Oxalic acid (solid, as dihydrate) | 0.1 |
|  | Water | 8 |
| 3 | Methyl cellulose | 0.25 |
|  | Phosphoric acid (same as above) | 1 |
|  | Oxalic acid (same as above) | 0.1 |
|  | Water | 8 |
| 4 | Oxalic acid (same as above) | 1 |
|  | Starch (same as above) | 1 |
|  | Water | 8 |

TABLE 2-continued

| Ex. No. | Ingredient | Parts by Weight |
| --- | --- | --- |
| 5 | Acrylic copolymer (emulsion form, see text) | 1 |
| | Phosphoric acid (75%) | 1 |
| | Oxalic acid | 0.1 |
| | Water | 8 |
| 6 | Water soluble resin binder (see text) | 0.5 |
| | Phosphoric acid | 1 |
| | Oxalic acid | 0.1 |
| | Water | 8 |
| 7 | Ingredients of Example 2 | 10 |
| | Additional water | 10 |
| 8 | Ingredients of Example 2 | 10 |
| | Additional water | 30 |

The composition of Example 2 appeared to perform best for most applications. The oxalic acid appeared to render the composition more uniform and easier to apply, and perhaps added some bleaching action.

Referring to the above examples 2-8 inclusive, the phosphoric acid was used as a solution of 75% $H_3PO_4$. 75% $H_3PO_4$ is approximately 50% $P_2O_5$. The $P_2O_5$ equivalent is an accepted basis for determining phosphoric acid equivalents, and is a method which is satisfactory in determing the equivalent amount of superphosphate and triple superphosphate referred to in certain of the examples herein. The starch in the later examples was the type used in Example 1, although any other starch which was stable (maintains its physical and chemical properties) while in contact with the phosphoric acid (and oxalic acid if present) is suitable. In preparing these starches, which may be taken from various suppliers and which differ among themselves, it is always desired that the starch be fully "cooked out" or swollen. For this purpose, the starch is mixed with a reasonable volume of water such as three to five times its weight, and the water is heated until such time as the starch has become fully clarified. After this, if additional water is required or desired, it may be added. at 20°-25° C. However, the customary practice is to add approximately the total amount of water which it is anticipated will be required when the starch is being prepared.

The oxalic acid in the above examples was calculated as the dihydrate, a white solid used in a technical or reagent grade.

The methyl cellulose of Example 3 was a suitable substitute for starch, but other cellulosic binders which are suitable include carboxymethyl cellulose ("CMC"), and carboxymethyl hydroxyethyl cellulose ("CMHEC"). Other water soluble adhesives or binders are suitable.

Example 5 relates to the use of an emulsion of a water insoluble acrylic material which is a carboxylated ethyl acrylate copolymer, available in 46% solids emulsion form. It is identified as "Rhoplex 10" and is available from the Rohm and Haas Company of Philadelphia. These and other known compositions known for use as adhesives may be used as a complete or partial placement for the starch or other binders, specifically referred to herein, or as a supplement to such binders.

Other resin emulsions, including emulsion glue type formations derived from polyvinyl alcohol and/or polyvinyl acetate ("Elmer's" Glue) by the Borden Company, for example) are also suitable for certain applications.

Resin or like materials of the type referred to in Example 6 include polyvinyl methyl ether, polyacrylamide, vinyl methyl ether-maleic anhydride copolyers, polyvinyl pyrrolidone, polyvinyl pyrrolidonevinyl acetate copolymers and the like known to be used for binding adhesive particles to paper.

Referring again to the use of the products set forth in the above examples, the composition of Example 2 was preferred for most relatively heavily stained concrete surfaces. The starch binder retarded evaporation and the oxalic acid bleached the unstained pigment so that, where new pigment was formed in place and bound to the surface, the overall appearance was smooth rather than spotted or streaked.

The composition of Example 3 functioned satisfactorily and demonstrated that cellulosic materials other than starch were able to act as a binder.

Example 4 used oxalic acid in place of the phosphoric acid. This composition was not as effective as the phosphoric acid-containing composition.

Example 5 was effective from the operational standpoint but created a generally water insoluble binding action, the advantages and disadvantages which are discussed herein.

Example 6 was similar in composition to Example 5, except that the binder, as in Examples 1-4 was water soluble. This composition was satisfactory, although because of the binder used, it is more expensive than the compositions using stains as a binder.

Examples 7 and 8 illustrate the use of the solution diluted with equal parts of water (Example 7) and with three parts of water per part of composition. Such compositions are suitable for use where staining is not heavy or wherein, for any reason, a large quantity of water is desired to be used.

The use of a water insoluble resin as the binder has certain advantages as well as certain drawbacks. For example, where the material is insoluble, it has increased resistant to oil and grease stains. Where used as a driveway treatment, therefore, a composition having an insoluble binder may permit subsequent treatment of the oil stains for removal while leaving the remainder of the driveway relatively unaffected. On the other hand, such material is more difficult to remove if the concrete requires additional re-treatment. In this connection, it will be observed that the objectionable stains on the concrete may result from sources exterior to the concrete, that is, the stains may occur following relatively frequent bathing of the concrete with water having iron and/or tannins dissolved therein, and/or exposure to tannin material in the air, or the like.

On the other hand, certain concrete stains may result from iron-containing material entrained into the concrete aggregate, which materials are attacked by water, with the creation of rust stains having their origin on the surface or within the body of the concrete itself. Still other stain sources include rusty or corrosion of adjacent metal window or door jambs, sash, electrical fittings, attachments for other structures, signs, etc.

The composition of the invention may, to a certain extent, remove or inhibit the growth of mildew and are also compatible with certain mildewcides and insecticides. Preliminary tests indicate that the material will remove mildew on badly stained concrete roof tiles, for example.

EXAMPLE 9

A composition similar to that of Example 2 also made in the same manner as the composition of Example 2, except that, instead of one part starch by weight, three parts of starch by weight were provided. This composition proved satisfactory in use, and illustrated that it was possible to provide a binder in an amount equal to at least three times the amount of phosphoric acid (75% $H_3PO_4$ basis) or its equivalent.

Example 3 illustrates the use of a binder in an amount equal to about 0.25 or less times the amount of phosphoric acid (75% $H_3PO_4$ basis) or less. Consequently, the ratio of binder to phosphoric component may vary at least within these ranges, although about equal parts of starch and 75% phosphoric acid are preferred.

Examples 10, 11 and 12 illustrate the practice of the invention utilizing materials other than phosphoric acid as the phosphate equivalent component of the composition.

| Ingredient | Parts by Weight |
| --- | --- |
| Starch (same as Example 2) | 1 |
| Superphosphate (see below) | 3 |
| Oxalic Acid (same as Example 2) | 0.1 |
| Water | 8 |

EXAMPLE 11

| Starch (same as Example 2) | 1 |
| --- | --- |
| Triple Superphosphate | 1 |
| Oxalic Acid (same as Example 2) | 0.1 |
| Water | 8 |

In the above composition, the superphosphate is the reaction product of phosphate rock (tricalcium phosphate) and sulfuric acid. It is believed to be about 30% $CaH_4(PO_4)_2.H_2O$, 10% $CaHPO_4$, 45% $CaSO_4$ and 15% iron and other oxides, water, etc. This product contains 17–21% available $P_2O_5$, and may be compared to phosphoric acid on this basis, with substantially equal parts being used on the basis of equivalent $P_2O_5$. Thus, three parts of superphosphate by weight contain substantially the same amount of $P_2O_5$ as one part of 75% $H_3PO_4$.

The triple super phosphate is the product resulting from the treatment of phosphate rock (tricalcium phosphate) and $H_3PO_4$. This product, as commercially available normally contains 43% to 50% available $P_2O_5$, with the commercially available form commonly having 46% $P_2O_5$. In the 50% $P_2O_5$ form, one part triple superphosphate is substantially equal to one part of 75% $H_3PO_4$.

EXAMPLE 12

| Ingredient | Parts by Weight |
| --- | --- |
| Starch (same as Example 2) | 3 |
| Triple Superphosphate | 1.5 |
| Superphosphate | 4.5 |
| Oxalic Acid (same as Example 2) | .3 |
| Water | 24 |

Example 12 illsutrates the mixture of the two phosphates, mixed between themselves in any proportion suitable to create a phosphate product having the $P_2O_5$ equivalent of phosphoric acid. While a wide range of proportions is useful, a typical mix of these compounds would contain three parts superphosphate and one part triple superphosphate by weight. Six parts of this mixture is equivalent to about three parts of 75% phosphoric acid as set forth in Examples 1 and 2, for example.

One advantage of the invention is that the solution of the type with which the invention is concerned may be used in a novel manner to act, at the same time, as a lawn fertilizer and as a driveway/sidewalk stain remover.

In this case, the novel material is premixed as a solution according to any one of the foregoing examples, and used by known methods in connection with the "water injection" system component of a lawn sprinkling system. Such systems are known to be used for injecting periodic dosages of lawn fertilizer into the sprinkling systems. In the case of the present invention, instead of conventional fertilizer, the solution of the invention is injected periodically, such as a few minutes daily. The phosphate component of the composition serves to fertilize the lawn when it falls on the lawn; when it overruns the lawn, or when the lawn is fully watered, excess treated water runs across the sidewalks or driveways. Here, the phosphoric acid reacts with and treats the stains, and the binder fastens the pigment thus formed in place to the surface of the concrete structure. Consequently, for the homeowner, it is now possible to fertilize and prevent or cure concrete staining in a single, economical manner.

While the reasons for the success of the invention are not known with certainty, and while it is not intended to limit the invention to any particular theory of operation, it is believed that the phosphoric acid is effective to react with iron rust, tannin derivatives, and other stains, as well as with the various of the array of compounds making up Portland cement itself. Unlike prior art compositions, many of which were intended to be removed after disloding the stain or stain-creating material, the composition of the present invention is intended to remain in place until fully dry, without rinsing or removal. According to the present invention, however, the reaction between the treatment composition and the stain creates what is believed to be a white inorganic pigment which is caused to adhere to the substrate by the action of the binder. The reaction between the phosphoric acid component and the remainder of the concrete also creates a limited amount of pigment material, leading to the creation of a relatively uniform coating, all of which is held in place by the binder to create a greatly improved, long-lasting renewed surface which is economical, free from environmental threats, and esthetically pleasing.

It will thus be seen that the present invention provides a novel surface treating composition, method, and treated surface, having a number of advantages and characteristics including those pointed out above and others which are inherent in the invention. A preferred embodiment of the invention having been described by way of illustration, it is anticipated that changes and modifications of the described treating composition, method, and treated surface will occur to those skilled in the art and that such changes and modifications may be made without departing from the spirit of the invention or the scope of the appended claims.

I claim:

1. A method of treating a stained concrete surface whereby said surface is treated and cleaned by creation of a pigment and said pigment is bonded to said surface as a covering therefor in a single operation, said method comprising:

completely wetting said surface with an excess of a treating solution containing, by weight, about one part of a pigment binder, one part phosphoric acid, and from eight to thirty parts of water;

permitting said phosphoric acid to react with the staining material on said stained surface to create a substantially white-colored water-insoluble pigment; and permitting said solution to dry in place while said binder becomes effective to bond the pigment created by reaction between said stain causing materials and said phosphoric acid.

2. The method of claim 1 wherein said pigment binder comprises a starch gel.

3. The method of claim 1 wherein said solution further includes from about 0.05 to about 0.2 parts of oxalic acid dihydrate.

* * * * *